(12) United States Patent
Chiang et al.

(10) Patent No.: US 6,491,959 B1
(45) Date of Patent: Dec. 10, 2002

(54) PRODUCTION OF CRISPY CORN-BASED SNACKS HAVING SURFACE BUBBLES

(75) Inventors: Bin-Yea Chiang, Cedar Knolls, NJ (US); Lynn C. Haynes, Morris Plains, NJ (US); Ronald J. Russell, Stone Mountain, GA (US); Marta H. Gomez, Pompton Plains, NJ (US); Kim M. Folta, New York, NY (US); Anita Bryant-Ray, Frederick, CO (US); Christina M. Fileti, Hackensack, NJ (US); Julia M. Carey, Madison, NJ (US)

(73) Assignee: Kraft Foods Holdings, Inc., Northfield, IL (US)

(*) Notice: Subject to any disclaimer, the term of this patent is extended or adjusted under 35 U.S.C. 154(b) by 0 days.

(21) Appl. No.: 09/723,377

(22) Filed: Nov. 28, 2000

Related U.S. Application Data

(60) Provisional application No. 60/240,156, filed on Oct. 13, 2000.

(51) Int. Cl.$^7$ ................................................ A21D 13/00
(52) U.S. Cl. ...................... 426/560; 426/549; 426/808
(58) Field of Search ................................. 426/808, 549, 426/560, 503, 523, 804

(56) References Cited

U.S. PATENT DOCUMENTS

| 678,749 A | 7/1901 | Moore et al. |
| 1,039,912 A | 10/1912 | Dollings |

(List continued on next page.)

FOREIGN PATENT DOCUMENTS

| CA | 637258 | 2/1962 |
| CA | 2082602 | 5/1993 |
| DE | 2604716 | 8/1976 |
| DE | 4137161 | 5/1993 |
| EP | 0184964 | 6/1986 |

(List continued on next page.)

OTHER PUBLICATIONS

Chemical Abstract #58556d of 17—Foods. vol. 80, 1974.
Tressler, Donald K. Ph.D., *Food Products Formulary*, vol. 2, Cereals, Baked Goods, Dairy and Egg Products, The AVI Publ. Co., Westport, CT., pps. 103–104 (1975).
"Low–Calorie, Baked Snack . . . 'Potato Pips'", *Engineered Foods Magazine*, p. 58 (Aug. 8, 1984).

(List continued on next page.)

*Primary Examiner*—Lien Tran
(74) *Attorney, Agent, or Firm*—Hollander Law Firm, P.L.C.

(57) ABSTRACT

Baked, corn-based, chip-like snacks having a plurality of surface bubbles comprising air pockets extending both above and below the substantially unleavened, adjacent portions of the snack are obtained with a pregelatinized waxy starch, a pregelatinized corn flour and baker's bran. The pregelatinized waxy starch forms the skin of the bubble. The pregelatinized corn flour aids in production of bubbles during baking and enhances corn flavor in the baked snacks. The baker's bran provides the baked corn-based chip-like snack with a rough appearance characteristic of tortilla chips. The pregelatinized waxy maize starch may be used in an amount of from about 5% by weight to about 25% by weight, the pregelatinized corn flour may be used in an amount of from about 5% by weight to about 20% by weight, and the baker's bran may be used in an amount of from about 0.1% by weight to about 10% by weight each based upon the weight of a corn flour having a degree of gelatinization of less than about 60%. Reduced fat, low-fat, and no-fat baked products, as well as full-fatted baked products, may be produced with a bubbled surface, and a crispy, crunchy, non-mealy, chip-like texture, but with a corn tortilla flavor.

30 Claims, 1 Drawing Sheet

U.S. PATENT DOCUMENTS

| | | |
|---|---|---|
| 1,169,023 A | 1/1916 | Embrey |
| 1,975,326 A | 10/1934 | Loose et al. |
| 2,204,045 A | 6/1940 | Meacham |
| 2,505,407 A | 4/1950 | Johnson |
| 2,584,893 A | 2/1952 | Lloyd et al. |
| 2,704,257 A | 3/1955 | Diez de Sollano et al. |
| 2,767,667 A | 10/1956 | Spooner |
| 2,823,625 A | 2/1958 | Oakes |
| 2,905,559 A | 9/1959 | Anderson et al. |
| 3,027,258 A | 3/1962 | Markakis et al. |
| 3,089,773 A | 5/1963 | Bates et al. |
| 3,194,664 A | 7/1965 | Eytinge |
| 3,276,397 A | 10/1966 | Poppe et al. |
| 3,278,311 A | 10/1966 | Brown et al. |
| 3,332,781 A | 7/1967 | Benson et al. |
| 3,348,950 A | 10/1967 | Weiss |
| 3,384,495 A | 5/1968 | Potter et al. |
| 3,451,822 A | 6/1969 | Fast et al. |
| 3,493,390 A | 2/1970 | Succo |
| 3,519,432 A | 7/1970 | Succo et al. |
| 3,539,356 A | 11/1970 | Benson et al. |
| 3,545,979 A | 12/1970 | Ghafoori |
| 3,600,193 A | 8/1971 | Glabe |
| 3,615,658 A | 10/1971 | Glabe |
| 3,615,697 A | 10/1971 | Hollenbeck |
| 3,652,294 A | 3/1972 | Marotta et al. |
| 3,690,895 A | 9/1972 | Amadon et al. |
| 3,698,309 A | 10/1972 | Steels |
| 3,698,914 A | 10/1972 | Kortschot et al. |
| 3,698,915 A | 10/1972 | Glasgow |
| 3,753,729 A | 8/1973 | Harms et al. |
| 3,753,735 A | 8/1973 | Gerkens |
| 3,800,050 A | 3/1974 | Popel |
| 3,821,441 A | 6/1974 | Tomita et al. |
| 3,857,982 A | 12/1974 | Sevenants |
| 3,860,735 A | 1/1975 | Hoshino |
| 3,864,505 A | 2/1975 | Hunter et al. |
| 3,873,748 A | 3/1975 | Schwab et al. |
| 3,886,291 A | 5/1975 | Willard |
| 3,922,370 A | 11/1975 | Prakash |
| 3,925,567 A | 12/1975 | Abe |
| 3,935,322 A | 1/1976 | Weiss et al. |
| 3,937,848 A | 2/1976 | Campbell et al. |
| 3,946,116 A | 3/1976 | Weaver et al. |
| 3,956,517 A | 5/1976 | Curry et al. |
| 3,982,032 A | 9/1976 | Koizumi |
| 3,988,875 A | 11/1976 | Fay |
| 3,997,684 A | 12/1976 | Willard |
| 3,998,975 A | 12/1976 | Liepa |
| 4,005,139 A | 1/1977 | Kortschot |
| 4,044,166 A | 8/1977 | Koizumi |
| 4,073,958 A | 2/1978 | Abe |
| 4,109,012 A | 8/1978 | Bates et al. |
| 4,109,024 A | 8/1978 | Cremer |
| 4,122,198 A | 10/1978 | Wisdom et al. |
| 4,126,706 A | 11/1978 | Hilton |
| 4,135,004 A | 1/1979 | Finkel |
| 4,140,801 A | 2/1979 | Hilton et al. |
| 4,163,804 A | 8/1979 | Meyer et al. |
| 4,167,588 A | 9/1979 | Willard |
| 4,170,659 A | 10/1979 | Totino et al. |
| 4,208,476 A | 6/1980 | Tsao |
| 4,209,536 A | 6/1980 | Dogliotti |
| 4,238,517 A | 12/1980 | Bosley, Jr. et al. |
| 4,266,920 A | 5/1981 | Hayashi et al. |
| 4,272,554 A | 6/1981 | Schroeder et al. |
| 4,277,510 A | 7/1981 | Wicklund et al. |
| 4,293,582 A | 10/1981 | Hamann et al. |
| 4,312,892 A | 1/1982 | Rubio |
| 4,326,455 A | 4/1982 | Rubio |
| 4,362,754 A | 12/1982 | Wenger et al. |
| 4,409,250 A | 10/1983 | Van Hulle et al. |
| 4,418,088 A | 11/1983 | Cantenot |
| 4,439,459 A | 3/1984 | Swartley |
| 4,446,163 A | 5/1984 | Galle et al. |
| 4,455,321 A | 6/1984 | Glabe |
| 4,505,942 A | 3/1985 | Ito et al. |
| 4,508,739 A | 4/1985 | Ryan |
| 4,517,204 A | 5/1985 | Mottur et al. |
| 4,526,800 A | 7/1985 | Howard |
| 4,528,202 A | 7/1985 | Wang et al. |
| 4,537,786 A | 8/1985 | Bernard |
| 4,555,409 A | 11/1985 | Hart |
| 4,560,569 A | 12/1985 | Ivers |
| 4,567,051 A | 1/1986 | Baker et al. |
| 4,568,557 A | 2/1986 | Becker et al. |
| 4,609,557 A | 9/1986 | Mao et al. |
| 4,613,508 A | 9/1986 | Shishido |
| 4,615,901 A | 10/1986 | Yoshioka et al. |
| 4,623,548 A | 11/1986 | Willard |
| 4,623,550 A | 11/1986 | Willard |
| 4,640,843 A | 2/1987 | Matuszak et al. |
| 4,645,679 A | 2/1987 | Lee, III et al. |
| 4,650,687 A | 3/1987 | Willard et al. |
| 4,735,811 A | 4/1988 | Skarra et al. |
| 4,749,579 A | 6/1988 | Haydock et al. |
| 4,752,493 A | 6/1988 | Moriki |
| 4,767,633 A | 8/1988 | Fowler |
| 4,769,253 A | 9/1988 | Willard |
| 4,770,891 A | 9/1988 | Willard |
| 4,781,932 A | 11/1988 | Skarra et al. |
| 4,803,091 A | 2/1989 | Mottur et al. |
| 4,834,996 A | 5/1989 | Fazzolare et al. |
| 4,844,919 A | 7/1989 | Szwerc |
| 4,855,151 A | 8/1989 | Fielding |
| 4,861,609 A | 8/1989 | Willard et al. |
| 4,863,750 A | 9/1989 | Pawlak et al. |
| 4,873,093 A | 10/1989 | Fazzolare et al. |
| 4,876,101 A | 10/1989 | Willard |
| 4,879,126 A | 11/1989 | Willard et al. |
| 4,880,371 A | 11/1989 | Spinelli et al. |
| 4,889,733 A | 12/1989 | Willard et al. |
| 4,889,737 A | 12/1989 | Willard et al. |
| 4,929,461 A | 5/1990 | Schonauer et al. |
| 4,931,303 A | 6/1990 | Holm et al. |
| 4,938,982 A | 7/1990 | Howard |
| 4,950,490 A | 8/1990 | Ghiasi et al. |
| 4,970,084 A | 11/1990 | Pirrotta et al. |
| 4,994,295 A | 2/1991 | Holm et al. |
| 5,000,968 A | 3/1991 | Szwerc et al. |
| 5,061,507 A | 10/1991 | Aulik et al. |
| 5,085,884 A | 2/1992 | Young et al. |
| 5,104,673 A | 4/1992 | Fazzolare et al. |
| 5,110,613 A | 5/1992 | Brown et al. |
| 5,147,675 A | 9/1992 | Gage et al. |
| 5,171,600 A | 12/1992 | Young et al. |
| 5,188,859 A | 2/1993 | Lodge et al. |
| 5,194,284 A | 3/1993 | Chiu et al. |
| 5,320,858 A | 6/1994 | Fazzolare et al. |
| 5,429,834 A | 7/1995 | Addesso et al. |
| 5,464,642 A | 11/1995 | Villagran et al. |
| 5,464,643 A | 11/1995 | Lodge |
| 5,500,240 A | 3/1996 | Addesso et al. |
| 5,505,978 A | 4/1996 | Roy et al. |
| 5,554,405 A | 9/1996 | Fazzolare et al. |
| 5,652,010 A | 7/1997 | Gimmler et al. |
| 5,690,982 A | 11/1997 | Fazzolare et al. |
| 5,695,804 A | 12/1997 | Hnat et al. |
| 5,747,092 A | 5/1998 | Carey et al. |
| 5,904,947 A | 5/1999 | Jensen et al. |
| 5,928,701 A | 7/1999 | Jensen et al. |

| | | | |
|---|---|---|---|
| 5,980,967 | A | 11/1999 | Carey et al. |
| 6,001,409 | A | 12/1999 | Gimmler et al. |
| 6,022,574 | A | 2/2000 | Lanner et al. |
| 6,033,707 | A | 3/2000 | Lanner et al. |
| 2002/0018837 | A1 | 2/2002 | Lanner et al. |
| 2002/0018838 | A1 | 2/2002 | Zimmerman et al. |
| 2002/0022076 | A1 | 2/2002 | Lanner et al. |
| 2002/0028273 | A1 | 3/2002 | Teras et al. |
| 2002/0034571 | A1 | 3/2002 | Zimmerman et al. |

FOREIGN PATENT DOCUMENTS

| | | |
|---|---|---|
| FR | 2267049 | 11/1975 |
| GB | 107218 | 6/1917 |
| GB | 1525631 | 9/1978 |
| GB | 2111816 | 7/1983 |
| JP | 54-01786 | 1/1979 |
| JP | 5432056 | 10/1979 |
| JP | 55108250 | 8/1980 |
| JP | 59031642 | 2/1984 |
| JP | 60168361 | 8/1985 |
| JP | 60244256 | 12/1985 |
| JP | 61202658 | 9/1986 |
| RU | 370933 | 11/1973 |

OTHER PUBLICATIONS

Pyler, E.J., "Baking Science and Technology", Siebel Publ. Co., Chicago, IL, 1973, pp. 428–429.

Matz, S.A., *Cookie and Cracker Technology*, The AVI Publ. Co., Chapter 18, pp. 238–253 (1968).

Matz, S.A., *Cookie and Cracker Technology*, The AVI Publ. Co., pp. 265–266 (1968).

Pyler, E.J., *Baking Science & Technology*, Sosland Publishing Co., Merriam, KS, 1988, pp. 1061–1062, 913, and 609.

*Foods and Food Preparation Encyclopedia*, Van Nostrand Reinhold Co., Inc., NY, NY, 1982, pp. 282–284.

Desrosier, N.W., *Elements of Food Technology*, AVI Publ. Co., Inc., Westport, Conn., 1977, pp. 479–482 and 468–469.

Cerletti, et al., "Maize Germ Proteins, Their Composition, Nutritive Value and Functional Properties", *Proc. Int. Assoc. Cereal Chem. Symp. Amino Acid Composition and Biological Value of Cereal Proteins*, Budapest, Hungary 1983, R. Lasztity, M. Hidvegi, eds.

Encyclopedia of Food Technology, vol. 2, pp. 262–267, (1974), The AVI Publishing Company, Inc.

Kotschevar, L.H., *Standards, Principals, and Techniques in Quality Food Production*, Van Nostrand Reinhold, NY, NY, 1988, pp. 404–407.

Whistler, et al., *Starch: Chemistry and Technology*, Academic Press, Inc., pp. 588–590 (1984).

"Methods in Carbohydrate Chemistry," Academic Press, 1964, vol. IV, pp. 168–169.

Matz, *Cookie and Cracker Technology*, 2nd ed., The AVI Publ. Co., Inc. (1968), pp. 11–12.

Atwell, et al., "*The Terminology and Methodology Associated With Basic Starch Phenomena*", *Cereal Food World*, vol. 33, No. 3, pp. 306–311 (Mar. 1988).

Molina, et al., "Drum Drying For The Improved Production Of Instant Tortilla Flour," *Journal of Food Science*, vol. 42, No. 6 (1977), pp. 1432–1434.

Whistler et al., *Starch: Chemistry & Technology*, Academic Press, Inc., pp 25, 30, 49–59 (1984).

Specifications for Baker's Bran, 10691, DOC, The Pillsbury Co., Sep. 29, 1999.

Flav–R–Grain® Fine Product Data, Quali Tech, Inc. (10/95).

Regular #O Yellow Product Data, Azteca Milling Co. (1/96).

PGF 1000 Pregelatinized Corn Flour, Lauhoff Grain Co. (7/97).

Pizzarias Pizza Chips, Pizza Supreme, sample of packaging including list of ingredients from trademark appln. No. 74/080,043, Jan. 1991 (first use in commerce), Keebler Company, Elmhurst, IL.

Pizzarias Pizza Chips, Zesty Pepperoni, sample of packaging including list of ingredients from trademark appln. No. 74/080,043, Jan. 1991 (first use in commerce), Keebler Company, Elmhurst, IL.

Zings Snack Chips, sample of packaging including list of ingredients, May 1991 (first use in commerce), Nabisco, Inc., East Hanover, NJ, from file wrapper of USSN 74/122,575.

Zings Snack Chips, color reproduction of packaging, including list of ingredients, 1991 (use in commerce), Nabisco, Inc., East Hanover, NJ.

Zings Ranch Cracker Chips, color reproduction of packaging including list of ingredients, 1991 (use in commerce), Nabisco, Inc., East Hanover, NJ.

Zings Cheddar Snack Chips, 1991 (use in commerce), Nabisco, Inc., East Hanover, NJ.

Munch'ems Seasoned Original, sample of packaging, including list of ingredients from trademark appln. No. 74/088,762, Jan. 1991 (first use in commerce), Keebler Company, Elmhurst, IL.

Munch'ems Southwest Salsa, sample of packaging including list of ingredients, Keebler Co. 1996 (copyright date).

Munch'ems Crackers, list of ingredients obtained from Keebler Company web site (possible use in commerce 1991).

Munch'ems Sour Cream & Onion Crackers, list of ingredients obtained from Keebler Company web site (possible use in commerce 1991).

Munch'ems Southwest Salsa Crackers, list of ingredients obtained from Keebler Company web site (possible use in commerce 1996).

Munch'ems Ranch Crackers, list of ingredients obtained from Keebler Company web site (possible use in commerce 1996).

Munch'ems Cheddar Crackers, list of ingredients obtained from Keebler Company web site (possible use in commerce 1991).

Munch'ems Reduced Fat Sour Cream and Onion Crackers, list of ingredients obtained from Keebler Company web site (possible use in commerce 1996).

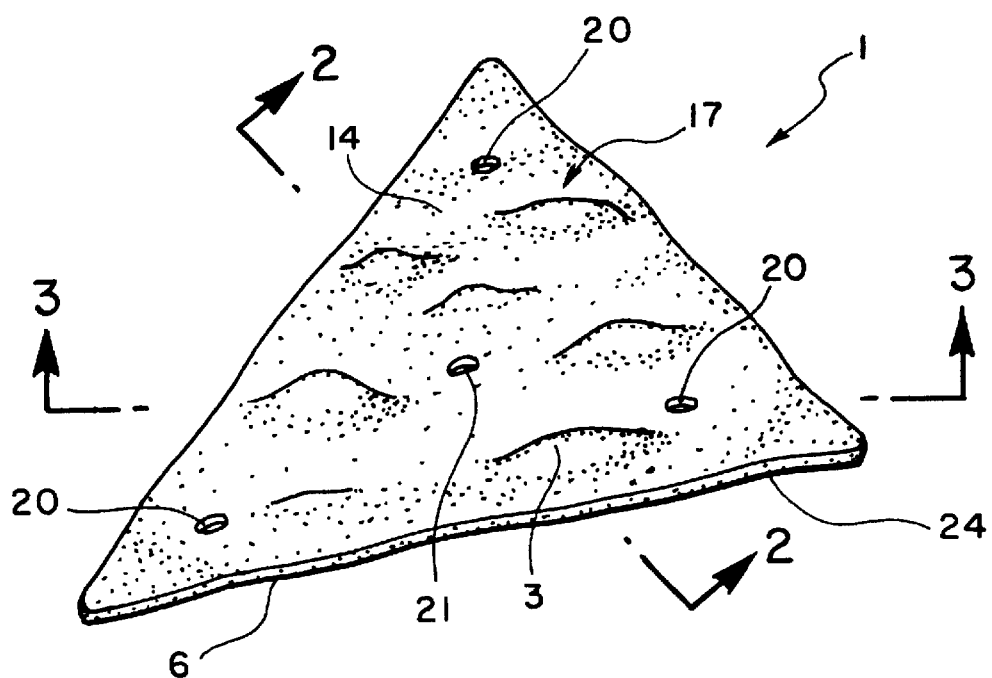
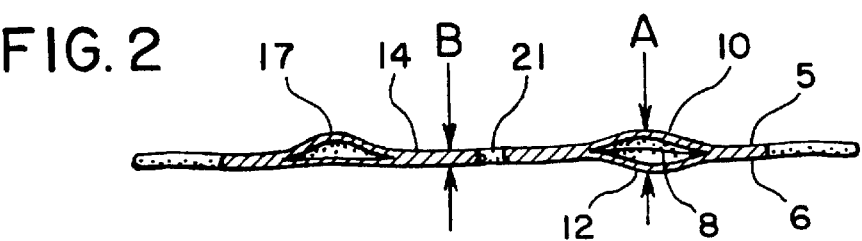
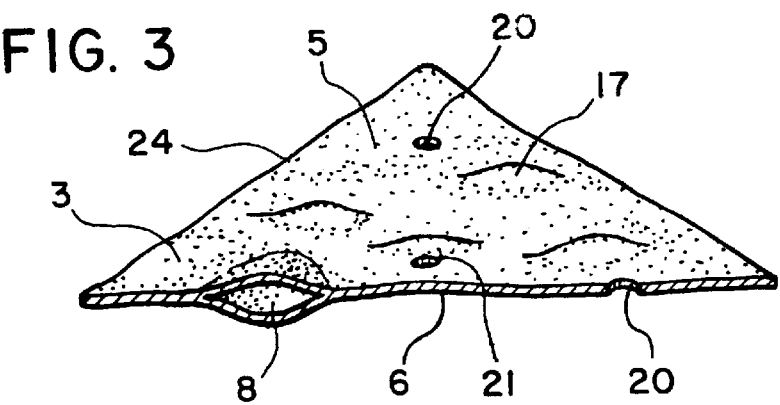

PRODUCTION OF CRISPY CORN-BASED SNACKS HAVING SURFACE BUBBLES

This application claims the benefit under 35 U.S.C. 119(e) of provisional application No. 60/240,156 filed Oct. 13, 2000 in the name of Gomez et al, for "Production of Crispy Corn-based Snacks," the disclosure of which is incorporated by reference in its entirety.

FIELD OF THE INVENTION

The present invention relates to the production of baked corn-based snacks having a chip-like crispy texture and surface bubbles.

BACKGROUND OF THE INVENTION

The production of traditional fried corn snacks generally involves a prolonged steeping step of about 10 to 20 hours. Whole kernels of corn are steeped in a hot lime solution to soften the outer hull and partially gelatinize the starch in the endosperm. The degree of gelatinization is generally about 10%. As disclosed in U.S. Pat. No. 4,645,679 to Lee, III, et al., both white and yellow corn of the dent type are added to a vat containing heated water and a proportionate amount of lime. The mixture is heated to the boiling point, the heat is cut off, and the contents of the vat are allowed to stand undisturbed for 10 to 20 hours. The lime loosens the pericarp from the endosperm so that water can reach the starch and so that the pericarp can be removed. If the pericarp remains, dough made from the steeped whole grains becomes excessively sticky. The corn kernels generally have a moisture content of at least about 50% by weight by the end of the steeping step. The heating and steeping steps result in hydration and partial hydrolysis of the corn hulls. The corn hulls are removed from the steeped kernels by washing. The washing may be performed with jets of water which also remove any remaining lime. The washed kernels are then ground in a stone mill into a dough containing about 50% or more moisture, known as masa.

As disclosed in U.S. Pat. No. 4,623,548 to Willard, the masa may be formed into thin pieces by extrusion, and the dough may be permitted to fall directly into hot cooking oil in a deep fat fryer. The oil replaces the water in the product resulting in a fried product having an undesirably high, for example at least 35% by weight, fat content and a hard and brittle texture. In another method, it is disclosed, a similar freshly ground masa is sheeted between rollers, cut into pieces, and baked to reduce the moisture content from about 35% to as low as about 20% before frying. According to U.S. Pat. No. 4,623,548 the dough should have a moisture content of about 50% for effective sheeting. Reducing the moisture content of the baked dough pieces reduces the fat content of the fried product to about 20% to 25%. However, according to U.S. Pat. No. 4,623,528 the fried pieces tend to have an uneven expansion, with large blistered areas and a hard, chewy texture. The same uneven structure, it is disclosed, is also found in the extruded masa-based snacks. Also, as disclosed in U.S. Pat. No. 4,645,679, the conventional process of producing corn chips has the disadvantages of producing chips which are gritty and do not easily melt in the mouth.

In the process of U.S. Pat. No. 4,645,679, hydrated corn having a moisture content of about 30% to about 40% is comminuted, and then admixed with a comminuted hydrated starch material selected from dehydrated potatoes, tapioca starch, corn starch, and mixtures thereof. However, the hydrated corn is still made by cooking raw corn kernels in water and lime, steeping until the hulls are softened, and washing the corn to remove the hulls. In a preferred embodiment the hydrated cut corn having a moisture content between about 30% and 40% is further hydrated by steeping it in water at a temperature of about 150° F. to about 170° F. for about 24 to about 48 hours to obtain a moisture content of about 60% to about 70%.

As disclosed in U.S. Pat. No. 4,623,548, dried masa flour has been used for the production of corn snacks and other Mexican food specialties, such as tortillas and taco shells. The dried masa flour is generally made by grinding the lime-treated corn and then dehydrating it to a stable form. A dried masa flour may then be rehydrated with water to form a dough for extrusion or sheeting. Whole corn kernels may be partially cooked, without lime treatment, that is without removing the outer hull, then dry-milled to obtain partially cooked, dry-milled whole corn flours. Dough for making a fried snack may be produced by mixing the whole corn flour with water. However, according to U.S. Pat. No. 4,623,548 fried snacks made from whole corn flours are hard and brittle and retain too much fat because of the low water absorption of the flours. In the process of U.S. Pat. No. 4,623,548, extruded expanded fried cereal-based snack products are produced using one or more raw or partially gelatinized cereal flours such as whole corn flour, masa flour, corn flour, barley flour, bulgur flour, cracked bulgur, oat flour, rye flakes, rye flour, and soy flour. The low water-absorbing component is admixed with a high water-absorbing component such as a pregelatinized cereal starch or flour or dehydrated potatoes. In addition, a starch component comprising one or more extraneously added ungelatinized starches is included. The three components, it is disclosed, are critical at the time of frying to obtain a controlled expansion into a well expanded, uniformly porous fried snack which differs from fried corn chips. The high water absorbing component, it is disclosed, retains the water in the formed dough piece as the temperature increases during frying. Sufficient water is therefore present at the gelatinization temperature to allow the other two components to absorb water when the dough reaches the gelatinization temperature and to cause formation of an expanded, uniformly porous fried snack.

U.S. Pat. Nos. 4,931,303 and 4,994,295 to Holm, et al. disclose that in the production of fabricated snack products having controlled surface bubbling, the dough sheet must have cohesive properties which permit the surface or surfaces of the dough or preform to stretch relatively uniformly when forming bubbles during frying. The highly cohesive, non-adhesive dough, it is disclosed, can be made by adjusting the quantity of free gelatinized starch, the degree of retrogradation of the starch (thereby affecting the water absorption of a given quantity of the starch) and the concentration of any starch-complexing emulsifiers present. In the Holm, et al. process, a dough may be formed comprising, e.g. potato solids or corn solids, raw or pre-gelatinized starches, modified starches, flavorings, oils, and the like. Dough pieces are subjected to case hardening by direct impingement gas-fired drying ovens, steam-heated conveyer dryers, infrared ovens or microwave ovens to promote surface bubbling during subsequent frying. It is disclosed that doughs containing less than about 30% moisture are generally too dry even after the Holm, et al. drying step to create adequate bubbles. In the Holm, et al. process, substantial moisture reduction of the dough is achieved by frying. During frying, the dough moisture content of about 30% to about 55% is reduced to obtain a fried product with a moisture content of about 1–2%. The product does not possess a light, crunchy texture.

German patent publication no. 4,137,161 (published May 13, 1993) to Reeg and corresponding Canadian patent publication no. 2082602 (published May 13, 1993) disclose the preparation of a maize dough for producing snack foods much as tortillas or taco shells by heating a mixture of ground corn, and water to 50–65° C. which is just over the gelling point of the starch. Heating may be applied by friction from the mixing equipment or by passing steam into the mixture. The mixture is cooled while the starch is only partly gelled. The mixing of the ingredients to a homogeneous mass is preferably completed at room temperature. The mixture also contains sufficient calcium hydroxide to give a pH of 9–11.

Production of corn-based products including reduced fat, low-fat, and no-fat chips, taco shells, soft tortillas, and soft tacos is disclosed in U.S. Pat. No. 6,001,409 to Gimmler et al. The disclosed process uses ground corn products thereby eliminating the need for prolonged steeping times associated with the production of fried corn products conventionally made from whole corn kernels. Chip-like snacks having a crisp texture and chip-like appearance are produced from coherent, machinable, sheetable dough without using a frying step for substantial moisture reduction of the dough thereby resulting in products having low-fat content. The products possess a masa flavor and appearance which are comparable to those of products made using a traditional steeping process. However the product does not have surface bubbles and surrounding crisp, thin regions.

Baked hollow expanded snacks in the form of a figure such as an animal or vehicle disclosed in U.S. Pat. No. 4,752,493 to Moriki are produced from a farinaceous raw mixture. The raw mixture is prepared by mixing from 60–95 parts by weight of at least one low swelling-capacity farinaceous material and 40–5 parts by weight of at least one high swelling-capacity farinaceous material. The low swelling-capacity material may be a non-glutinous cereal such as wheat, rye, maize, non-glutinous rice, sago, sorghum, triticale, millet and beans, or starches separated from these sources. The high swelling-capacity material may be potato, taro, tapioca, arrowroot, sweet potato, glutinous rice, waxy corn, or starches derived from these sources having their cell walls broken. The farinaceous raw mixture is partly gelatinized prior to rolling into a smooth sheet by the addition of hot water or by the action of steam, so as to raise the temperature of the farinaceous raw mixture to 65° C. to 90° C. According to Moriki, upon baking, the starch in the surface of the dough pieces is gelatinized, thereby forming a skin having good gas-holding capacity and excellent stretchability. Water and volatile materials in the dough pieces push the skin outward upon heating, so that the dough pieces expand and are internally split into two layers or shells, forming a hollow space therebetween.

The filled crackers of U.S. Pat. No. 5,000,968 to Szwerc et al. are produced from a dough containing proteolytic enzymes. The enzymes hydrolyze proteins of the flour, which relaxes the dough and thereby permits a hollow center to be formed, rather than a cellular center, as the cracker expands under the influence of the leavening agent during baking. This, it is disclosed, strengthens the shell of the cracker and permits the cracker to be filled by means of an injection needle piercing the surface of the cracker.

The production of chip-like, starch-based snacks having a crispy texture and surface blisters from starch-based compositions which have little or no gluten, such as potato flour or corn flour, is disclosed in U.S. Pat. Nos. 4,873,093 and 4,834,996 to Fazzolare et al. and U.S. Pat. Nos. 5,429,834 and 5,500,240 to Addesso et al. Starch-based compositions which have little or no gluten, when mixed with water, do not form a dough that is cohesive at room temperature and continuously machinable or sheetable. Machinability of dough made from ingredients having little or no gluten may be improved by forming a dough under elevated temperature conditions, such as by steaming the ingredients, as disclosed in U.S. Pat. Nos. 4,873,093 and 4,834,996 to Fazzolare et al.

In the process of U.S. Pat. Nos. 5,429,834 and 5,500,240 to Addesso et al, use of a pregelatinized waxy starch provides for the production of cohesive, extensible, continuously machinable dough from starchy materials or ingredients having starch with no or low gluten. These machinable dough may be formed at room temperatures without the need for steaming or heat treatment to develop cohesiveness, extensibility, and machinability.

U.S. Pat. No. 4,560,569 to Ivers discloses that in the production of a dough-based fried food product, a processed starch in either gelatinized or ungelatinized form is frequently added when a low-starch flour or flake is employed. Water, it is disclosed, is required to soften the flour, and depending upon the protein content of the flour, to form a network of protein (gluten), which is the framework of the product. According to Ivers, starch, which is present in flours, is used as a binder and is required for the unleavened product to expand upon frying. Dough stickiness and hardness of the cooked product may be controlled by the addition of oil to the dough to control the extent of the protein framework. The dough is prepared by adjusting the ratios of components and the mixing time to allow it to sheet uniformly at the desired thickness without sticking or tearing. According to Ivers, addition of a small amount of a lecithin-in-water suspension to the formulation of the dough-based fried snack foods improves the transfer, sheeting and cutting, and significantly reduces clumping during frying, without the rapid buildup of free fatty acids and without significant darkening of frying oil, normally associated with the frying of foods containing lecithin.

U.S. Pat. No. 5,980,967 to Carey et al discloses production of wheat-based baked snacks containing a pregelatinized starch in the dough to create surface bubbles tends to result in a styrofoam-like or compressible texture, rather than a highly crisp, crunchy texture. Also, if the pregelatinized starch is not sufficiently hydrated prior to baking, bubbles created during baking tend to collapse.

In the present invention, corn-based, chip-like snacks having a crisp, crunchy chip-like texture and bubbles distributed over their surfaces are produced from cohesive, machinable, sheetable dough, without using a frying step for substantial moisture reduction of the dough, thereby resulting in products having low fat content. Surface bubbles comprising air pockets which extend from opposing surfaces are created and maintained during baking. The bubbles are maintained in portions of the baked dough, even though surrounding or adjacent portions of the dough have been dockered or punctured before baking. A pregelatinized waxy starch provides an extensible surface film prior to baking, which helps to temporarily trap moisture below the expandable film surface upon baking. Pregelatinized corn flour substantially improves corn flavor, and small amounts of baker's bran provides the chip-like product with an appearance of roughness on the surface without deleteriously affecting bubble formation or retention. In addition, the machinable, continuously sheetable, corn-based dough may be produced at low temperatures. Sufficient hydration of the pregelatinized waxy starch and pregelatinized corn flour may be achieved by premixing them with hot water or by providing sufficient dough lay time for hydration to occur.

The crispy, bubbled, corn-based snacks of the present invention include reduced fat, low-fat, and no-fat baked products, as well as full-fatted baked products.

SUMMARY OF THE INVENTION

The present invention provides a baked, corn-based, chip-like snack having surface bubbles comprising air pockets extending both above and below the substantially unleavened, adjacent portions of the snack. Dockering or piercing of the dough prior to baking results in localized unleavened or thinned areas and does not prevent the attainment of a plurality of discrete bubbles. Reduced fat, low-fat, and no-fat baked products, as well as full-fatted baked products, may be produced on a mass- production, continuous basis in accordance with the present invention. They are produced by admixing corn flour or corn meal, a film-forming pregelatinized waxy starch, a bubble-producing, flavor enhancing, pregelatinized corn flour, and a baker's bran with water to hydrate the starch and flour materials and produce a machinable dough. Pregelatinized waxy maize starch is the preferred pregelatinized waxy starch. The pregelatinized corn flour is at least substantially completely pregelatinized corn flour. In addition to forming bubbles, it also improves and intensifies the corn flavor in the baked snack and enhances crispiness and crunchiness of the baked corn-based snacks. The corn flour or corn meal is preferably a partially gelatinized corn flour with a degree of gelatinization not exceeding about 60% and it is substantially different in functionality from the bubble-producing pregelatinized corn flour.

Use of the corn flour or corn meal, film-forming amounts of the pregelatinized waxy starch, and bubble-forming amounts of the pregelatinized corn flour provides for the production of a cohesive, non-sticky, extensible, continuously machinable dough. In embodiments of the invention, additional flavor ingredients, such as toasted corn germ, may be used along with the pregelatinized corn flour to enhance corn flavor of the final chip-like product. Also, baker's bran may be used to provide the surface of the chip-like product with a rough appearance, characteristic of fried corn tortilla or fried corn chips.

The machinable dough of the present invention may be formed at room temperatures, without the need for steaming or heat treatment to develop cohesiveness, extensibility, and machinability. The dough may be machined using conventional cracker-dough technology, involving sheeting, dough-sheet lamination, dough-sheet thickness reduction, and cutting of the dough sheet into pieces.

In embodiments of the present invention, the dough pieces have a moisture content of from about 20% to about 50% by weight, preferably from about 25% by weight to about 45% by weight, more preferably from about 28% by weight to about 40% by weight. The moisture content of the dough pieces is reduced from these high levels to less than about 10% by weight, preferably less than about 5% by weight, most preferably less than about 3.5% by weight, by baking the pieces. This moisture reduction by baking results in baked pieces each having a plurality of surface bubbles distributed throughout their surfaces. The pieces may also include blisters interspersed with the bubbles. In embodiments of the present invention, frying may be performed subsequent to baking. The avoidance of frying for substantial moisture reduction of the dough pieces permits the attainment of crisp, chip-like snacks having a vegetable shortening or oil or fat content less than 20% by weight of the finished product.

In preferred embodiments of the present invention, a baked, corn-based, chip-like snack having surface bubbles and the texture and appearance of a corn chip, with the taste or flavor of tortilla products, may be produced without a leavened, mealy texture or a diluted, low intensity corn flavor.

The baked corn-based snacks may be produced by admixing: 1) corn flour or corn meal, which is only partially gelatinized, 2) pregelatinized waxy starch in an amount of from about 5% by weight to about 25% by weight, preferably from about 10% by weight to about 20% by weight, based upon the weight of the corn flour or corn meal, 3) at least substantially completely pregelatinized corn flour in an amount of from about 5% by weight to about 20% by weight, preferably from about 8% by weight to about 15% by weight, based upon the weight of the corn flour or corn meal, 4) from 0.1% by weight to about 10% by weight, preferably from about 0.5% by weight to about 5% by weight, of the baker's bran, based upon the weight of the corn flour, and 5) water to hydrate said flours and starches and to form a machinable dough having a moisture content of preferably from about 28% by weight to about 40% by weight.

The dough may then be laminated upon itself, reduced in thickness to form a thin sheet, and then cut into pieces. The dough pieces are heated to reduce their moisture content and to obtain chip-like products having a bubbled appearance and a crisp texture and which make an audible crunching sound upon mastication.

BRIEF DESCRIPTION OF THE DRAWINGS

The present invention is further illustrated by the accompanying drawings wherein:

FIG. 1 is a perspective view of a bubbled snack of the present invention.

FIG. 2 is a cross-sectional view along line 2—2 of the snack of FIG. 1.

FIG. 3 is a cross-sectional perspective view along line 3—3 of the snack of FIG. 1.

DETAILED DESCRIPTION OF THE INVENTION

The baked, corn-based snacks of the present invention include reduced fat, low-fat, and no-fat baked products, as well as full-fatted baked products. They have the taste and flavor of a corn tortilla or a corn chip and the crispy, crunchy texture, rather than a leavened, mealy texture. Also, the snack chips 1 have surface bubbles 3 distributed over their top and bottom surfaces 5, 6 as shown, for example, in FIGS. 1, 2, and 3. As shown in FIGS. 2 and 3, the bubbles 3 provide air pockets 8 within thinned, concave downwardly curved upper walls 10 and thinned, concave upwardly curved lower walls 12. The bubbles 3 and the air pockets 8 each extend a substantial distance both above and below adjacent, generally flat, crispy, substantially unleavened, thin areas 14 of the baked pieces 1, as shown in FIGS. 1, 2, and 3.

The vertical dimensions of the bubbles 3 and of the air pockets 8 are substantially greater than the vertical dimensions of surrounding, adjacent, substantially flat areas 14 of the snack piece 1. In embodiments of the invention, the ratio of the maximum vertical distance A between the upper surface and lower surface of at least two bubbles 3 per piece 1 to the maximum thickness B of the adjacent, generally flat, crispy, unbubbled and non-blistered areas 14 is at least about 2:1, preferably at least about 2.5:1, most preferably at least about 2.75:1. The horizontal dimension of the bubbles 3 and of the air pockets 8 are substantially greater than the vertical dimension of the bubbles 3. In the embodiments of the invention, the ratio of maximum horizontal distance C between the opposite edge sides of the bubbles 3 to the maximum vertical distance A between the upper surface and the lower surface of the bubbles 3 is at least 1.7:1, preferably 2:1, most preferably 2.25:1. The pieces 1 may also include one or more blisters 17 interspersed with the bubbles 3, as shown in FIGS. 1 and 2. The blisters 17 extend from only one surface, such as top surface 5, of the piece 1, whereas the bubbles 3 extend from opposing surfaces 5 and 6 of the piece 1.

In preferred embodiments, the snacks 1 are provided with one or more docker holes 20 to reduce checking and to help to avoid pillowing or the creation of an entirely puffed surface. A plurality of discrete bubbles 3 may be obtained, even though the sheeted dough of the present invention are dockered or pierced prior to baking. In embodiments of the invention, the central docker hole 21 may be larger than the remaining, surrounding docker holes 20. The peripheral edge 24 of the snack 1 may include scalloping which extend around the entire periphery of the snack piece 1.

In accordance with the present invention, surface bubbling is achieved with the use of a film-forming pregelatinized waxy starch and pregelatinized corn flour which is at least substantially completely pregelatinized. The pregelatinized waxy starch provides an extensible surface film prior to baking, which temporarily traps moisture below the expandable film surface upon baking. Upon baking, the pregelatinized waxy starch forms the skin of the bubble. A pregelatinized corn flour enhances and/or promotes surface bubbling and enhances the corn flavor and aids in production of a crispy, crunchy, substantially unleavened texture in the bubbled portions of the snack, as well as in the remaining or unbubbled portions.

In the production of the corn-based products, the pregelatinized waxy starch and the pregelatinized corn flour have a high degree of starch gelatinization (as measured by differential scanning calorimetry (DSC)). Generally, starch gelatinization occurs when: a) water in a sufficient amount, generally at least about 30% by weight, based upon the weight of the starch, is added to and mixed with starch and, b) the temperature of the starch is raised to at least about 80° C. (176° F.), preferably 100° C. (212° F.) or more. The gelatinization temperature depends upon the amount of water available for interaction with the starch. The lower the amount of available water, generally, the higher the gelatinization temperature. Gelatinization may be defined as the collapse (disruption) of molecular orders within the starch granule, manifested in irreversible changes in properties such as granular swelling, native crystallite melting, loss of birefringence, and starch solubilization. The temperature of the initial stage of gelatinization and the temperature range over which it occurs are governed by starch concentration, method of observation, granule type, and heterogeneities within the granule population under observation. Pasting is the second-stage phenomenon following the first stage of gelatinization in the dissolution of starch. It involves increased granular swelling, exudation of molecular components (i.e. amylose, followed by amylopectin) from the granule, and eventually, total disruption of the granules. See Atwell et al., "The Terminology And Methodology Associated With Basic Starch Phenomena," *Cereal Foods World*, Vol. 33, No. 3, pgs. 306–311 (March 1988). In embodiments of the present invention, the starch granules of the pregelatinized starches may be at least about 85% gelatinized, preferably at least about 90% gelatinized, more preferably at least about 95% gelatinized, most preferably completely gelatinized.

Pregelatinized waxy starches or pregelatinized high amylopectin-content starches which may be used in the present invention include pregelatinized waxy maize starch, pregelatinized waxy rice starch, and mixtures thereof. The preferred pregelatinized waxy starch for achieving cohesiveness, dough extensibility, dough machinability and bubble formation is a modified waxy maize starch such as Modified Corn Starch X-Pand'R F4-612 produced by A.E. Staley Manufacturing Company. The preferred pregelatinized waxy maize starch is not chemically modified nor acid hydrolyzed. The pregelatinized waxy starch preferably has a moisture content of less than or equal to about 6% by weight and a pH of about 5 to about 6. The Brabender neutral viscosity of the pregelatinized waxy starch may be at least 680 BU at 25° C., with the time required to reach peak viscosity at 25° C. being a maximum of 20 minutes. The particle size distribution of the pregelatinized waxy starch may be less than or equal to about 20% by weight retained on a 50-mesh screen and less than or equal to about 30% passing through a 200-mesh screen. If the particle size is too small, the pregelatinized starch tends to hydrate predominately on the surface. Increasing the particle size of the pregelatinized waxy starch tends to increase its ability to form homogeneous dry blends with the pregelatinized corn flour and reduces its tendency to form lumps.

The amount of the pregelatinized waxy starch which may be used in embodiments of the present invention range from about 5% by weight to about 25% by weight, preferably from about 10% by weight to about 20% by weight of the corn flour or corn meal. Amounts greater than about 25% by weight tend to result in a styrofoam-like or compressible, compactable, less crispy, crunchy texture. Also, the presence of too much pregelatinized waxy starch may dilute the basic flavor resulting in chips with a weak corn flavor. Amounts less than 5% by weight tend to result in insufficient bubble formation.

Pregelatinized corn flour, which may be used in the present invention to enhance and/or promote surface bubbling, and to intensify the corn flavor, includes pregelatinized yellow corn flour, pregelatinized white corn flour and mixtures thereof. Pregelatinized corn flour is at least substantially completely gelatinized corn flour with a degree of gelatinization of at least about 85%, preferably at least about 95%. Most preferably the pregelatinized corn flour is completely gelatinized corn flour with a degree of gelatinization equal to about 100%. A preferred pregelatinized corn flour for use in the present invention is yellow corn flour such as corn flour PGF 1000 produced by Lauhoff Grain Company. The pregelatinized corn flour preferably has a moisture content of less than or equal to about 10% by weight and a bulk density of from about 25 Lbs./ft$^3$ to about 45 Lbs./ft$^3$. The pregelatinized corn flour preferably has a maximum ash content of 0.8%. The particle size distribution of the pregelatinized corn flour may be less than or equal to about 4% by weight retained on a 100-mesh screen.

Pregelatinized corn flour contains a much higher proportion of exudated amylopectin than partially pregelatinized corn flour. The high proportion of the relatively short-chained amylopectin in pregelatinized corn flour promotes surface-bubble formation and improves the crispy texture of the product. Partially pregelatinized corn flour, unlike pregelatinized corn flour, does not promote bubble formation or promote an enhanced crispy texture.

The amount of the pregelatinized corn flour which may be used in embodiments of the present invention may range from about 5% by weight to about 20% by weight, preferably from about 8% by weight to about 15% by weight of the corn flour or corn meal.

The use of pregelatinized corn flour in amounts greater than about 20% by weight based on the weight of the partially- or non-gelatinized corn flour or corn meal tends to result in a poorly machinable, hard dough that may break upon machining, such as during continuous sheeting or lamination. The use of the pregelatinized corn flour in amounts less than 5% by weight based on the weight of the partially- or non-gelatinized corn flour or corn meal does not significantly improve crispness or flavor characteristics of the resulting snack, and may result in insufficient bubble expansion.

Baker's bran which may be used in the present invention provides the corn-based snack with the rough appearance characteristic of corn tortillas. The amount of the baker's bran which may be used in embodiments of the present invention range from about 0.1% by weight to about 10% by weight, preferably from about 0.5% by weight to about 5% by weight of the corn flour or corn meal. Amounts greater than about 10% by weight tend to dilute corn flavor and may interfere with the bubble formation. Preferred baker's bran is a dry, flaky wheat bran product, brown and tan in color, such as baker's bran 10691 manufactured by the Pillsbury Company. The baker's bran 10691 has 14–18% protein, about 4% fat and a moisture content of less than about 14.5%.

A small amount of toasted corn germ may be optionally included in some of the embodiments of the present invention to enhance the natural corn flavor of the baked chips and provide the chips with a pleasant roasted nut or pop-corn flavor. Preferred toasted corn germ is toasted corn germ such as fine Flav-R-Grain®, manufactured by Quali Tech, Inc. The toasted corn germ may have a moisture content of about 1% to 5%, bulk density of about 22 to 32 Lbs./cu.ft., and as size distribution may be less than or equal to about 5% by weight retained on a 16 U.S. mesh screen.

The toasted corn germ may be used in an amount of from 0.5% by weight to about 10% by weight, based upon the weight of the corn flour.

A small amount of modified potato starch may optionally be included in embodiments of the present invention to enhance or promote surface bubbling and crispiness and crunchiness of the baked corn-based snacks. The use of a raw modified potato starch provides functionality during baking, while the pregelatinized starches are functional prior to baking.

A preferred modified potato starch for use in embodiments of the present invention is an esterified potato starch such as Perfectamyl AC, manufactured by Avebe America, Inc. It is a raw, acetylated, but not crosslinked, potato starch. The modified potato starch may have a moisture content of about 170 to 190 mg/g, a pH of about 5.0 to about 7.0, and a sulfite content (as $SO_2$) of less than or equal to about 5 mg/kg. The particle size distribution of the modified potato starch may be less than or equal to about 8% by weight retained on a 120 U.S. mesh screen.

The optional modified potato starch may be used in an amount of from 0% by weight to about 10% by weight, based upon the weight of the corn flour.

The optional modified potato starch promotes a crispy, crunchy texture in the corn-based snacks and also affects the amount of bubbles retained in the final product. Excessive amounts of the optional modified potato starch may substantially or completely eliminate the desired bubble formation and adversely dilute the corn flavor.

The corn flour or corn meal used in the corn-based snacks of the present invention may be a flour of common dent corn, waxy corn, white corn, yellow corn, other color corns, or mixture thereof. Yellow corn flour is preferred because it generally provides a texture which is characteristic of typical table tortillas. Mixtures of different corn flours may be used in the present invention to attain the desired texture or flavor of the end product. The corn flour used in the present invention may be a fine or a coarse ground corn flour or corn meal.

The corn flour that is preferably used in the present invention is partially gelatinized corn flour. As discussed above, upon gelatinization or the collapse (disruption) of molecular orders within the starch granule, irreversible changes in properties of starch-containing materials take place. Exudation of molecular components from the starch granule begins with exudation of linear long chain amylose, followed by shorter branched amylopectin chains, and eventually, the granules are totally disrupted with all of the starch molecules existing outside of the collapsed granule. The ratio of exudated amylose to exudated amylopectin during partial collapse of the granule or partial gelatinization, is important for formation of a cohesive dough and quality of the final baked product. If the degree of gelatinization is low and not enough of the exudated or extra-granular long chain amylose molecules are present in the partially gelatinized starch, it may be difficult to form a cohesive, elastic machinable dough. If the degree of gelatinization is too high, then the amount of exudated amylose and amylopectin can be high which may lead to the dough becoming too sticky and poorly or non-machinable. Moreover, extragranular amylose and amylopectin possess high water retention capacities. Also, the presence of high amounts of extra-granular amylose and amylopectin requires addition of large amounts of water to the dough to hydrate the starch materials. Thus, a high amount of extra-granular amylose and amylopectin may also lead to increased baking times or temperatures to eliminate all of the water added to the dough. This, in turn, may have an adverse effect on the texture, checking or breakage, and the flavor of the baked snack. In addition, high amounts of exudated amylopectin in a pregelatinized corn flour leads to a product having undesirable glassiness and hardness upon baking. Accordingly, in accordance with the present invention, a pregelatinized corn flour is employed with a major portion of a partially- or non-gelatinized corn flour to reduce the amount of exudated or extragranular amylose and amylopectin and to provide a tender, crispy texture, while providing a ratio of exudated amylose to amylopectin for machinability, cohesiveness, and dough elasticity.

A completely gelatinized yellow corn flour having all of the starch granules disrupted contains, for example, about 21% of exudated amylose based on the weight of the flour. Non-gelatinized corn flour contains less than 0.05% of extra-granular amylose, based upon the weight of the flour. Amounts of exudated long chain amylose in the partially gelatinized corn flour should be between about 0.7% to about 10%, preferably between about 0.9% to about 3% based on the weight of the partially gelatinized corn flour, which usually corresponds to a degree of gelatinization between about 10% and 60% based on the amount of the starch. The amount of extra-granular amylose in the partially gelatinized corn flour suitable for use in the present invention should be such that it is greater than about 0.6% by weight based on the total weight of the corn flour, pregelatinized waxy starch, the pregelatinized corn flour and other optional starchy components. Amounts of the exudated amylose less than about 0.6% by weight of the total weight of the flours and the starches tend to produce a dough with unsatisfactory cohesive and machining properties. In preferred embodiments, the degree of gelatinization of the partially gelatinized corn flour is from about 15% to about 40%, most preferably from about 20% to about 35%. If the degree of gelatinization is less than about 10%, the amount of exudated amylose is low and a cohesive dough may not be obtained. If the degree of gelatinization is above about 60%, the baked product becomes hard and glassy due to the presence of large amounts of exudated amylopectin.

Another important characteristic of a corn flour is the ratio of exudated amylose to exudated amylopectin. As the ratio increases, so does the ability of the flour to form a cohesive, elastic, non-breakable machinable dough. In non-gelatinized flour, and some partially gelatinized corn flour, the ratio is between about 1.2:1 and about 1.3:1. However, it is possible to increase the ratio during partial gelatinization of a corn flour employing certain gelatinization conditions. In the preferred embodiments, partially gelatinized corn flour should have an exudated amylose to exudated amylopectin ratio of greater than about 1.35:1, most preferably greater than about 1.45:1. The amylose to amylopectin ratio may be measured by the modified Blue Value Test. The Blue Value Test is a common test for determining the amount of amylose present in solution. A complete description of the Blue Value Test is disclosed in "Methods in Carbohydrate Chemistry", Academic Press, 1964, volume IV, pages 168–69, herein incorporated by reference. In the modified test, a test solution is prepared by volumetrically dissolving 2–3 grams of the starch containing material in water in 25 ml volumetric flask. Two ml of the solution is then removed and centrifuged to separate insoluble particles. A 0.2 to 0.4 ml sample of supernatant is placed in a 50 ml volumetric flask and 10 ml of 0.1 N NaOH is added followed by addition of 10 ml of 0.1 N HCl. After this point the standard Blue Value test is followed starting from the step of addition of potassium hydrogen tartrate. The color development is measured at 620 nm (blue, amylose) as in the standard test, and at 525 nm (red, amylopectin). The ratio of 620 nm/525 nm measurements indicates the relative amounts of amylose and amylopectin chains.

The corn flour may be tempered or annealed at mild temperatures to increase the melting point of the corn starch contained in the corn flour. It is possible to increase the melting point by over 10° C., and to modify the actual degree of crystallinity of the starch contained in the corn flour. Increasing the melting point stabilizes the starches, preventing or decreasing gelatinization of starches during baking, which results in a more tender and less hard texture of the final baked product. Also, because the water retention capacity of non-gelatinized starch is significantly lower compared to the water retention capacity of gelatinized starch, it is easier to reduce the moisture content to the targeted low amounts in the dough that contains corn flour with a lower degree of gelatinization. Therefore dough containing starches having higher melting points, which slows or prevents starches from gelatinizing upon baking, requires shorter baking times or lower baking temperatures to attain the desired level of residual moisture.

Preferred corn flour is limed yellow corn flour such as Maseca corn flour produced by Azteca Milling Company. For example, regular yellow Maseca flour is prepared by cooking in lime water, grinding and drying yellow corn. The moisture content of the flour may be between 5% and 13%, and the ash content may be between 1 and 2.5%. The particle size distribution of the Maseca corn flour may be less than or equal to about 20% by weight retained on a 60 U.S. mesh screen and at least 40% by weight retained on a 120 U.S. mesh screen. The amylose/amylopectin ratio for the Maseca flour is about 1.5, with a degree of gelatinization of the flour of about 20%.

The corn flour or corn meal may be used in an amount of from about 30% by weight to about 80% by weight, preferably from about 45% by weight to about 75% by weight, based upon the weight of the dough. Other flours, such as rice flour, wheat flour, oat flour, and the like, tend to result in a mealy, styrofoam-like, less crunchy texture. They may be used in amounts which do not adversely affect bubble production and retention or a crispy, crunchy texture or a corn flavor, such as less than about 10% by weight, preferably less than about 5% by weight of the corn flour. In embodiments of the present invention, corn germ may be used to obtain the flavor and color of different tortilla products, without adversely affecting bubble formation and retention.

The amount of water added to produce the machinable dough of the present invention should be sufficient to provide a moisture content of from about 20% by weight to about 50% by weight, more preferably from about 23% to about 38% by weight, most preferably from about 25% to about 35% by weight, based upon the weight of the dough.

In embodiments of the invention, the amount of corn-based starchy ingredients comprising partially gelatinized corn flour, pregelatinized waxy starch, and at least substantially completely gelatinized corn flour may be at least about 50% by weight, preferably at least about 55% by weight, based upon the weight of the baked product.

As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less, or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers, or biscuits or wafers, used as snacks, and for chips, the reference amount is 30 grams. Thus, the fat content of a low-fat chip, snack, cracker, or wafer, would therefore be less than or equal to 3 grams of fat per 50 grams, or less than or equal to about 6% fat, based upon the total weight of the final product. A no-fat accompaniment cracker would have a fat content of less than 0.5 grams per 15 grams, or less than about 3.3%, based upon the weight of the final product. A no-fat chip, snack, or wafer having a label serving size of 28 grams would have a fat content of less than 0.5 grams per 28 grams, or less than about 1.8% by weight, based upon the weight of the final product.

Oleaginous compositions, which may be used to obtain the corn-based baked full-fat, reduced-fat, low-fat, or no-fat baked snacks of the present invention, may include any known shortening or fat blends or compositions useful for baking applications, and they may include conventional food-grade emulsifiers. Vegetable oils, lard, marine oils, and mixtures thereof, which are fractionated, partially hydrogenated, and/or interesterified, are exemplary of the shortenings or fats which may be used in the present invention. Edible reduced- or low-calorie, or non-digestible fats, fat-substitutes, or synthetic fats, such as sucrose polyesters, which are process-compatible may also be used. Mixtures of hard and soft fats or shortenings and oils may be used to achieve a desired consistency or melting profile in the oleaginous composition. Exemplary of the edible triglycerides which can be used to obtain the oleaginous compositions for use in the present invention include naturally occurring triglycerides derived from vegetable sources such as soybean oil, palm kernel oil, palm oil, rapeseed oil, safflower oil, sesame oil, sunflower seed oil, and mixtures thereof. Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Preferred oleaginous compositions for use in the present invention comprise purified soybean oil in which the lecithin has been removed during purification. The added shortening or fat content of the wheat-based snack dough of the present invention may range from about 0 to about 12% by weight, based upon the weight of the wheat flour, noninclusive of any topping oil. The shortening or fat content of the snack chips, inclusive of any topping oil, may be less than about 20% by weight, preferably less than about 10% by weight, based upon the weight of the dough.

One or more emulsifiers may be included in the dough of the present invention to facilitate dough mixing, reduce dough stickiness, and facilitate machining, provided they do not adversely affect bubbling or the attainment of a crispy, crunchy texture. Exemplary of emulsifiers which may be used are mono- and di-glycerides, and fluid, unbleached lecithin derived from the phosphatides of phospholipids of soybean oil. This fluid lecithin is an oil-based, flowable liquid at room temperature and typically has a moisture content of less than or equal to about 1% by weight. Exemplary amounts of the emulsifiers may range from about 0.1% to about 1% by weight, based on the weight of the corn flour.

The chip-like snacks of the present invention may include process-compatible flavoring and texturizing ingredients, and leavening or pH-adjusting agents. Process-compatible ingredients, which can be used to modify the texture of the products produced in the present invention, include sugars such as sucrose, fructose, lactose, dextrose, galactose, maltodextrins, corn syrup solids, hydrogenated starch hydrolysates, protein hydrolysates, glucose syrup, mixtures thereof, and the like. Reducing sugars, such as fructose, maltose, lactose, and dextrose, or mixtures of reducing sugars may be used to promote browning. Fructose is the preferred reducing sugar, because of its ready availability and its generally more enhanced browning and flavor-development effects. Exemplary sources of fructose include invert syrup, high fructose corn syrup, molasses, brown sugar, maple syrup, mixtures thereof, and the like.

The texturizing ingredient, such as sugar, may be admixed with the other ingredients in either solid or crystalline form, such as crystalline or granulated sucrose, granulated brown sugar, or crystalline fructose, or in liquid form, such as sucrose syrup or high fructose corn syrup. In embodiments of the invention, humectant sugars, such as high fructose corn syrup, maltose, sorbose, galactose, corn syrup, glucose syrup, invert syrup, honey, molasses, fructose, lactose, dextrose, and mixtures thereof, may be used to reduce hardness of the baked product and provide flavor and color.

The dough compositions of the present invention may contain up to about 5% by weight of a leavening system or pH-adjusting agents, based upon the weight of the corn flour. Exemplary of chemical leavening agents or pH-adjusting agents which may be used include alkaline materials and acidic materials such as sodium bicarbonate, ammonium bicarbonate, calcium acid phosphate, calcium phosphate (monobasic, monohydrate), sodium acid pyrophosphate, diammonium phosphate, tartaric acid, mixtures thereof, and the like.

In addition to the foregoing, the snack chips of the invention may include other additives conventionally employed in crackers and snacks. Such additives may include, for example, milk by-products, egg or egg by-products, cheese, salt, monosodium glutamate, pepper, garlic, onion or other flavorings commonly used for flavoring tortilla chips. For example, salt may be added to the dough in an amount of up to about 3% by weight, based upon the weight of the corn flour.

Conventional snack-flavoring, -seasoning, and -coloring ingredients, odorants, condiments, and mixtures thereof may be blended into the dough composition or sprinkled upon the dough composition before baking or applied to the product after baking. Exemplary of such ingredients which may be used include flavorings such as barbecue, sour cream, chives, onion, garlic, butter, vinegar, ranch, bacon, chicken, beef, cheese, ham, and nacho flavorings, dried vegetable flakes and herb flakes such as pepper, basil, thyme, peppermint, dried tomato, and parsley flakes, condiment flakes, spices, cheese powders such as cheddar cheese and nacho cheese seasoning powders, and mixtures thereof.

The machinable dough may be produced in accordance with the present invention at dough temperatures of less than about 125° F., preferably less than about 120° F., and most preferably at temperatures of about 85° F. to 95° F. At dough temperatures above about 120° F., dough stickiness tends to increase and may adversely affect lamination and sheetability. Ingredients may be added at room temperature or slightly above room temperature and mixed to form a dough, without the application of external heat such as from steam injection or heating jackets. Heat generated by the mechanical mixing action in the mixer or heat provided by ingredients added at elevated temperatures may be used to maintain the dough temperature within a desired range.

Corn-based Snack-Chip Dough Production

In preparing full-fat, no-fat, low-fat, and reduced-fat, corn-based, bubbled snack chips by the method of the present invention, the ingredients used may comprise corn flour, waxy starch, pregelatinized corn flour, baker's bran, water, optional shortening or fat, sodium bicarbonate and a food-grade acidic compound to effect leavening.

When producing, corn-based, bubbled snack chips by the method of the present invention, the conventional mixing steps may be employed. All the ingredients, with the exception of the emulsifier, liquid vegetable shortening and water may be preblended in a mixer by mixing at low speed. Then emulsifier is dissolved in a portion of water required by the total formula and the solution is added to the mixer followed by the addition of vegetable liquid shortening and the remainder of the water. The mixture is then mixed at low speed for a time sufficient to produce cohesive, non-lumpy dough. The mixing time may range from about 2 minutes to about 15 minutes.

Dough Machining and Baking

Various machining processes can be used to form the corn-based dough into dough pieces. Machining can include the processes used in standard cracker technology. For example, the corn-based dough of the present invention may be sheeted, optionally laminated, then cut and baked. Lamination is preferred for the controlled development of surface bubbles. Alternative machining processes include the use of a tortilla machine in which the dough-like composition is rolled and formed into pieces without being laminated.

In a preferred machining process, the dough is formed into a sheet by gauge or reduction rollers and enters a dough-laminating machine, such as a cut-sheet laminator or sweep-arm laminator. The laminating operation can be performed by overlapping laminator of about one-fourth inch thickness each, such that one sheet is placed upon another. Typically, between 3 to 6 laminae are layered together during this operation. The laminate may be formed by folding the sheeted dough upon itself. Separate dough sheets may also be used to form a laminate.

The laminated dough-like composition is then reduced in thickness. Reduction of the dough mass is performed in stages. For example, after three laminae are formed into a sheet, the sheet may then be compressed to about one-sixteenth inch. For four laminae, the dough sheet may first be reduced in thickness to about ½" and then to about ¼". The reductions in thickness may be performed by the use of one or more sets of counterrotating reduction rolls. In either case, a final reduction in thickness is done by a gauge roller. The dough is reduced during this operation to a final thickness of about 1/32 of an inch. At this point, the sheet generally has a width-to-thickness ratio of at least about 350.

The finish gauge-roll knives should be maintained sharp to provide a smooth dough sheet surface and to avoid formation of a rough surface on the dough sheet, which would reduce bubble formation. An even dusting of flour may be applied to the dough sheet surface before it enters the finishing rollers to reduce stickiness and assure attainment of a smooth dough surface.

The machined dough-like composition is then cut into dough pieces. Cutting can be performed by a reciprocating cutter, a rotary cutter, or other dough-cutting mechanisms. The cut dough pieces may be circular, triangular, rectangular, or square in shape, shaped like a potato slice, or any other desirable configuration. In preferred embodiments, the dough piece is cut to provide a scalloped edge or periphery. The circular dough piece may have a diameter of about 1¼ inches to about 1¾ inches. A square dough piece may have a length and width of about 1 inch to about 1¼ inches. For a potato slice configuration, the maximum length of the dough piece may range from about 2 inches to about 3.5 inches. The maximum width of the dough piece may range from about 1.25 to about 2.5 inches. Topping salt can be added at about 0.5% to 2% of the final product weight.

Dockering or piercing the uncut sheet or cut pieces can optionally be included in the machining operation. Each dough piece preferably contains from about 1 to about 7 docker holes. In preferred embodiments, a docker hole is provided in about the center of the dough piece, to assist in avoidance of pillowing or puffing of essentially the entire piece. The docker holes may be the same or different in size. For example, in embodiments of the invention, the central docker hole may be larger than the remaining docker holes by a factor of about 2 or more. In addition to avoiding pillowing, dockering decreases the occurrence of "checking" or the formation of undesirable stress lines that cause breakage in the final product.

The cut pieces may then be conveyed or transported to a convection oven for baking. The dough sheeting, cutting, and dockering operations may occur at substantially the same dough temperatures and moisture contents as those of the dough produced in the mixer. Thus, the dough pieces, upon entering a baking oven, may have a temperature of less than or equal to about 125° F., preferably less than about 120° F., and a dough moisture content of preferably about 23% by weight to about 38% by weight. During the baking step, the dough moisture content is substantially reduced to form a plurality of surface bubbles which comprise air pockets between opposing surfaces of the baked pieces. The dough-piece moisture content is preferably reduced from above about 23% by weight to preferably less than about 3.5% by weight during baking.

The dough pieces may be baked in conventional ovens, preferably a conventional gas-fired band oven having a plurality of temperature zones. The substantial reduction of the moisture content of the dough pieces in the baking oven causes the formation of curled configurations having a plurality of bubbles comprising air pockets substantially throughout the opposing top and bottom surfaces of the baked piece. The pieces may in addition have blisters, which extend from only one surface rather than two surfaces like a bubble. However, the baking preferably results in a predominance, for example greater than 50%, of the surface area delamination of each piece being in the form of bubbles rather than single surface blisters. The substantial reduction in moisture content during baking also substantially reduces checking of the final product. Upon exiting the gas-fired band oven, the baked pieces preferably have a moisture content of less than or equal to about 3.5% by weight, most preferably less than about 3% by weight, and a temperature of at least about 220° F. In embodiments of the invention, the product exit temperature may be from about 275° F. to about 310° F.

Exemplary baking temperatures within a multizone baking oven range from about 200° F. to about 650° F. Baking times may range from about 2 minutes to about 7 minutes. The fast application of higher temperatures yields a rapid formation of steam within the dough pieces. Steam, present within the pieces, gives rise to bubble formation as the pieces are being baked. The film-forming, pregelatinized waxy starch provides a film which entraps or holds moisture temporarily within the dough piece. Also, the exterior portions of the pieces dry rapidly and trap steam formed in the internal portion of the pieces. As the steam forms under an external layer, it performs a function similar to the leavening agent and causes expansion of the dough-like composition. With sufficiently thin dough pieces, the build-up of steam within the piece creates sufficient pressure to expand opposing surfaces at a given location on the piece to create a bubble comprising an air pocket at the location.

In preferred embodiments, the dough pieces are subjected to the highest heat in the first half of the oven, to generate bubbles and then set or case-harden the bubbles to prevent collapse of the bubbles, before entering the second half of the oven. The second half of the oven may then be operated at much lower temperatures for further moisture reduction and color development. Exemplary baking temperatures, which may be used within the first half of the oven for bubble generation and case-hardening, may range from about 450° F. to about 630° F. for top heating and from about 310° F. to about 500° F. for bottom heating. In a specific preferred embodiment, the highest temperatures are used in the second zone of a seven temperature zone oven for top heating at a temperature of at least about 500° F. for bubble development. Sealing or case-hardening of the bubbles preferably takes place in the third zone of the same oven at a top-heat temperature of from about 50° F. to about 75° F. less than used in the second zone. The first zone may, for example, be operated at a temperature of from about 200° F. to about 425° F. Exemplary temperatures, which may be used in the second half of the oven for moisture reduction and browning, may range from about 200° F. to about 500° F. The band temperature is preferably at least about 275° F., most preferably at least about 300° F., in at least the second and third temperature zones.

After baking in the gas-fired oven, the dough pieces may be further dried by dielectric energy application, which disperses the moisture present within the piece and decreases the total moisture of the piece. In embodiments of the invention, the dielectric heating step may reduce the moisture content to a level which is from about 0.5% to about 1% by weight lower. For example, if the moisture content leaving the gas-fired oven is 2.5% by weight, the dielectric heating may be used to reduce the moisture content of the pieces to about 1.5% by weight to about 2% by weight. In preferred embodiments of the present invention, the moisture content of the dough pieces leaving the dielectric oven may be less than or equal to about 2.25% by weight. The dielectric heating tends to remove moisture from the areas of the dough piece having a higher moisture content, thereby reducing moisture gradients within the piece which tend to cause checking.

In preferred embodiments, the baked and optionally dielectrically treated pieces are sprayed with oil to increase palatability and provide a medium for the adhesion of seasoning ingredients. In addition, baked and optionally dielectrically heated pieces may be further subjected to moisture equilibration in an annealing tunnel at product temperatures of from about 140° F. to about 200° F., preferably from about 160° F. to about 190° F. Moisture reduction during annealing may range from about 0.2% to about 0.5%, which may further reduce checking. After baking and optional dielectric heating and optional annealing, the oil-sprayed product may be subjected to tumbling for the addition of particulate seasoning ingredients.

The moisture content of the products upon packaging is preferably from about 0.5% by weight to about 3.75% by weight, and their water activity or relative humidity is less than about 0.4, preferably less than about 0.3, most preferably less than about 0.2. The products are preferably packaged in vapor-proof packaging materials. The bulk density of the oil-topped snack products of the present invention may range from about 5 to about 9.5. The bulk density of the snack products without an oil topping may range preferably from about 6 to about 8 lbs. per cubic foot. The snack products of the present invention may contain the starch ingredients, such as the corn flour, pregelatinized waxy starch, pregelatinized corn flour, in a total amount of at least 65% by weight, based upon the weight of the final product.

In other embodiments of the present invention, the dough pieces, after having their moisture conten reduced to less than about 10%, preferably less than about 5%, most preferably less than about 3.5% by weight, by heating in air, such as in a gas-fired oven, may be subjected to frying to enhance flavor while keeping the fat or oil content of the final product low.

The following examples, wherein all parts, percentages, and ratios are by weight, and all temperatures are in ° F. unless indicated to the contrary, illustrate the present invention:

EXAMPLE 1

The ingredients and their relative amounts, which may be used to produce a cohesive, machinable dough for producing a corn-based snack having a plurality of surface bubbles, a crispy, crunchy, chip-like texture and corn flavor, are:

|  | Parts by weight |
| --- | --- |
| Dough Ingredients |  |
| Yellow corn Maseca flour, (about 7% by weight water) | 85.00 |
| Baker's bran | 1.0 |
| Pregelatinized waxy maize starch | 10.00 |
| Pregelatinized yellow corn flour | 15.00 |
| Fine granulated sugar | 6.00 |
| Dough salt | 0.5 |
| Sodium Aluminum phosphate | 0.375 |
| Sodium bicarbonate | 0.375 |
| Ammonium bicarbonate | 0.25 |
| Emulsifier | 0.5 |
| Liquid vegetable shortening | 5.0 |
| Flavor components | 3.47 |
| Calcium hydroxide | 0.125 |
| Toasted corn germ (fine) | 6.25 |
| Water | 67.19 |
| TOTAL | 201.035 |
| Topping Ingredients |  |
| Salt | 2.00 |
| Shortening (vegetable oil) | 13.6 |

The dough may be formed by first dry-blending all of the dry components except for emulsifier in a mixer at low speed of about 25 rpm. The emulsifier is dissolved in approximately 30% by weight of the water and the solution is admixed with the preblend of dry components. The liquid vegetable shortening and the remaining water is then added and all of the ingredients may then be mixed to obtain a dough having at room temperature for about 4 minutes at low speed. The dough may be covered and then proofed or permitted to lay for about 0.5 hours to about 2.0 hours. On a calculated basis, the moisture content of the dough may be about 32.5% to about 35% by weight.

The proofed dough may then be transferred to conventional reduction rollers to form a continuous sheet of about ¼ inch in thickness. The sheet may be laminated in a conventional cracker dough cut-sheet laminating machine to obtain a laminate of four laminae. The four-layer laminate may then be reduced in thickness in three stages to a thickness of about 1/32 inch using reduction rollers. The first stage of rollers may reduce the laminate thickness to about ½ inch. The second stage of rollers may reduce the thickness to about ¼ inch. The last stage of rollers may reduce the dough-sheet thickness from about ¼ inch to the final 1/32 inch. The roll knives should be maintained sharp to avoid formation of a rough surface on the dough sheet, which would reduce bubble formation.

The laminate may be cut into triangular-shaped pieces of about 1⅞" per side with slightly rounded corners or apexes using a rotary cutter. The cutting may also produce four equally sized docker holes in each piece. The dockering may include a central docker hole, with the remaining three docker holes approximately equally spaced from the central docker hole and from each other, and located near each of the three corners or apexes. The docker holes help prevent pillowing or puffing while obtaining substantial bubbling.

The scrap may be removed, the topping salt may be applied, and the pieces may then be conveyed through a conventional gas-fired band oven having seven temperature zones. Upon entry into the oven, the dough pieces may still have a moisture content of about 24.5% to about 26% by weight. The baking temperatures in the front half of the oven may range from about 310° F. to about 535° F. In the back half of the oven, the baking temperatures may range from about 200° F. to about 480° F. The highest baking temperatures may be in the first half of the oven in the second and third zones to produce bubbles in the pieces in the second zone and to case-harden or seal the pieces and set or lock-in the bubbles in the third zone. Baking temperatures in the remaining zones develop flavor and promote Maillard browning. The band temperature in at least the second and third zones may be at least about 285° F. The baking time may range from about 2.5 minutes to about 3.0 minutes. The moisture content of the dough pieces exiting the baking oven may be from about 1% by weight to about 2.75% by weight. The water activity or relative humidity of the pieces may be less than about 0.2. Upon exiting the gas-fired oven, the temperature of the pieces may be about 220° F. or higher. The exiting pieces have a bubbled, chip-like appearance. The bulk density of the baked product may range from about 6.8 to about 7.8 pounds per cubic foot.

The baked product may be transferred to a tunnel where it is sprayed with topping oil. The sprayed product may then be transferred to an annealing tunnel to equilibrate its moisture and to reduce the moisture content by about 0.2% to about 0.4%. Upon exiting the annealing tunnel, the product temperature may be about 160° F. to about 190° F. The water activity or relative humidity of the pieces may be less than about 0.15. The product may then be transferred to a packaging operation for packaging in moisture-proof bags. The final oil-sprayed product may have an oil content of about 14% to about 18.5% by weight, based upon the weight of the final product.

What is claimed is:

1. A method for the production of a baked, corn-based snack having surface bubbles and a crispy texture comprising:
   a) admixing ingredients comprising (1) a partially gelatinized corn flour having a degree of gelatinization of less than about 60% as determined by differential scanning calorimetry, (2) a pregelatinized waxy starch in an amount of from about 5% by weight to about 25% by weight, based upon the weight of the partially gelatinized corn flour, (3) a substantially pregelatinized corn flour in an amount of from about 5% by weight to about 20% by weight, based upon the weight of the partially gelatinized corn flour, said substantially pregelatinized corn flour having a degree of gelatinization of at least about 85% as determined by differential scanning calorimetry, and (4) water to hydrate said flours and starch and to form a machinable dough, wherein the water content of said dough is from about 20% by weight to about 50% by weight, based upon the weight of the dough,
   b) sheeting the dough,
   c) forming the dough into pieces, and
   d) baking the pieces to produce a plurality of surface bubbles in the baked pieces, said bubbles comprising air pockets and extending both above and below adjacent, generally flat, crispy, substantially unleavened areas of the baked pieces.

2. A method as claimed in claim 1, wherein from about 0.1% by weight to about 10% by weight of bran, based upon the weight of the partially gelatinized corn flour is admixed with said ingredients to form said machinable dough.

3. A method as claimed in claim 1, wherein from about 0.5% by weight to about 5% by weight of bran, based upon the weight of the partially gelatinized corn flour is admixed with said ingredients to form said machinable dough.

4. A method as claimed in claim 3, wherein said bran is baker's bran.

5. A method as claimed in claim 1, wherein the amount of said substantially pregelatinized corn flour is from about 8% by weight to about 15% by weight, based upon the weight of said partially gelatinized corn flour.

6. A method as claimed in claim 1, wherein the amount of pregelatinized waxy starch is from about 10% by weight to about 20% by weight, based upon the weight of the partially gelatinized corn flour.

7. A method as claimed in claim 1, wherein the degree of gelatinization of said partially gelatinized corn flour is from about 10% to about 40%.

8. A method as claimed in claim 7, wherein the degree of gelatinization of said partially gelatinized corn flour is between about 25% and about 35%.

9. A method as claimed in claim 1, wherein the degree of gelatinization of said substantially pregelatinized corn flour is greater than about 95% as determined by differential scanning calorimetry.

10. A method as claimed in claim 1, wherein the melting temperature of the starch of said partially gelatinized corn flour is greater than about 78° C.

11. A method as claimed in claim 10, wherein the melting temperature of the starch of said partially gelatinized corn flour is greater than about 81° C.

12. A method as claimed in claim 7, wherein the amount of extra-granular amylose in said partially gelatinized corn flour is greater than about 0.8% by weight, based on the total weight of said corn flour.

13. A method as claimed in claim 1, wherein the ratio of the maximum vertical distance between the upper surface and lower surface of said bubbles to the maximum thickness of said adjacent, generally flat, crispy areas is at least about 2:1.

14. A method as claimed in claim 1, wherein said sheeted dough is laminated and said pieces are dockered.

15. A method as claimed in claim 10, wherein said baking reduces the moisture content of said pieces to less than about 5% by weight, based upon the weight of said pieces.

16. A method as claimed in claim 1, wherein in step d) said dough pieces are baked in a multiple zone oven having a first half and a second half in which the dough pieces are subject to the highest heat in the first half of said oven.

17. A method as claimed in claim 1, wherein the ratio of exudated amylose to exudated amylopectin in said partially gelatinized corn flour is greater than about 1.35:1.

18. A method as claimed in claim 1, wherein the ratio of exudated amylose to exudated amylopectin in said partially gelatinized corn flour is greater than about 1.45:1.

19. A corn-based snack product having surface bubbles and a crispy texture and which is baked from a dough which comprises an admixture of:
   a partially gelatinized corn flour having a degree of gelatinization of less than about 60% as determined by differential scanning calorimetry,
   a pregelatinized waxy starch in an amount of from about 5% by weight to about 25% by weight, based upon the weight of the partially gelatinized corn flour,
   a substantially pregelatinized corn flour in an amount of from about 5% by weight to about 20% by weight, based upon the weight of the partially gelatinized corn flour, said substantially pregelatinized corn flour having a degree of at least about 85% as determined by differential scanning calorimetry, and water to hydrate said flours and starch and to form a machinable dough, wherein the water content of said snack product is less than about 10% by weight, based upon the weight of the product, and further wherein said bubbles comprise air pockets and extend both above and below adjacent, generally flat, crispy, substantially unleavened areas of the baked product.

20. A corn-based snack product as claimed in claim 19, wherein from about 0.1% by weight to about 10% by weight of bran, based upon the weight of the partially gelatinized corn flour is admixed with said ingredients to form said dough.

21. A corn-based snack product as claimed in claim 20, wherein said bran is baker's bran.

22. A corn-based snack product as claimed in claim 19, wherein the amount of said substantially pregelatinized corn flour is from about 8% by weight to about 15% by weight, based upon the weight of said partially gelatinized corn flour.

23. A corn-based snack product as claimed in claim 19, wherein the amount of pregelatinized waxy starch is from about 10% by weight to about 20% by weight, based upon the weight of the partially gelatinized corn flour.

24. A corn-based snack product as claimed in claim 19, wherein the degree of gelatinization of said substantially pregelatinized corn flour is greater than about 95% as determined by differential scanning calorimetry.

25. A corn-based snack product as claimed in claim 19, wherein the ratio of the maximum vertical distance between the upper surface and lower surface of said bubbles to the maximum thickness of said adjacent, generally flat, crispy areas is at least about 2:1.

26. A corn-based snack product as claimed in claim 19, comprising at least one docker hole.

27. A corn-based snack product as claimed in claim 19, which is a reduced fat, a low-fat, or a no-fat snack product.

28. A corn-based snack product as claimed in claim 27, wherein the fat content of the snack product is less than about 20% by weight, based on the weight of the final product.

29. A corn-based snack product as claimed in claim 19, wherein the ratio of exudated amylose to exudated amylopectin in said partially gelatinized corn flour is greater than about 1.35:1.

30. A corn-based snack product as claimed in claim 19, wherein the amount of corn-based starchy ingredients comprising said partially gelatinized corn flour, pregelatinized waxy starch, and substantially gelatinized corn flour is at least about 50% by weight, based upon the weight of the baked product.

* * * * *